(12) United States Patent
Mitchell

(10) Patent No.: US 6,550,817 B1
(45) Date of Patent: Apr. 22, 2003

(54) BEARINGED SWIVEL CONNECTOR FOR FUEL DISPENSING NOZZLE

(75) Inventor: Thomas O. Mitchell, St. Louis, MO (US)

(73) Assignee: Husky Corporation, Pacific, MO (US)

( * ) Notice: Subject to any disclaimer, the term of this patent is extended or adjusted under 35 U.S.C. 154(b) by 0 days.

(21) Appl. No.: 09/626,614

(22) Filed: Jul. 27, 2000

(51) Int. Cl.$^7$ ................................ F16L 27/08
(52) U.S. Cl. ........................ 285/147.1; 285/276
(58) Field of Search .................... 285/121.5, 121.6, 285/147.1, 147.3, 276, FOR 117, FOR 150; 222/566; 141/387, 389

(56) References Cited

U.S. PATENT DOCUMENTS

| | | | |
|---|---|---|---|
| 991,501 A | * 5/1911 | Graves | 285/147.1 |
| 1,938,829 A | * 12/1933 | Hamer | 285/147.1 X |
| 2,501,638 A | * 3/1950 | Warren | 285/147.1 X |
| 2,745,682 A | * 5/1956 | Chevallier | 285/276 X |
| 2,746,773 A | * 5/1956 | Bily | 285/276 X |
| 3,199,898 A | * 8/1965 | Faccou | 285/121.6 X |
| 3,372,715 A | * 3/1968 | Ashton | 141/387 |
| 4,103,938 A | * 8/1978 | Lasater et al. | 285/276 X |
| D268,612 S | 4/1983 | Sutcliffe | |
| 4,598,427 A | * 7/1986 | Vykukal | 285/147.1 X |
| 4,615,547 A | 10/1986 | Sutcliffe et al. | |

OTHER PUBLICATIONS

Chiksan Catalog RP–2, FMC Corp., Chiksan Div., Bres, CA., 1962, 285/276, pp/ A, B, F, Q, & P.*
OPW; OPW Hose End Swivels Apr. 1995.

* cited by examiner

Primary Examiner—Greg Binda
(74) Attorney, Agent, or Firm—Paul M. Denk

(57) ABSTRACT

A ball bearing swivel connectable between the output end of a fuel dispensing hose and the input end of a fuel dispensing nozzle to allow multi-plane rotation of the nozzle The swivel includes three segments, a nozzle fitting, a midsection, and a hose fitting. The end segments are joined to the midsection by ball bearing races which allow each segment to rotate 360° relative to the adjacent segment. The ball bearing races are positioned between a first and second O-ring seal to prevent dust or dirt accumulation and fuel leakage. The ball bearing races allow rotation of the swivel under increased fluid pressure conditions.

6 Claims, 3 Drawing Sheets

BEARINGED SWIVEL CONNECTOR FOR FUEL DISPENSING NOZZLE

CROSS-REFERENCE TO RELATED APPLICATIONS

None

BACKGROUND OF THE INVENTION

The invention relates generally to fuel dispensing systems and, more specifically, to a swivel which is incorporated into a fuel dispensing hose including a fuel dispensing nozzle to allow freedom of rotation or articulation of a fuel dispensing nozzle in more than one plane without twisting or binding of the hose when a user is aligning the fuel dispensing nozzle with the fillpipe of a vehicle, for example.

Fuel dispensing systems are known to the art. For example, the A0360 Hose Swivel (Emco Wheaton Retail Corporation, Wilson, N.C.); The OPW 25 and OPW 36S (OPW Fueling Components, Cincinnati, Ohio) are examples of hose swivels used in fuel dispensing system hoses. Generally, these representative styles of hose end swivels are designed for use with the nozzle inlet, i.e. at the juncture of the fuel dispensing hose and the nozzle. The prior art nozzles usually allow one plane of swiveling rotation.

U.S. Pat. No. 4,615,547, owned by the common assignee of the instant invention provides for a multi-plane swivel connector. U.S. Pat. No. Des. 268,612, also owned by the common assignee, which does not disclose the functional elements of the illustrated swivel connector, shows a novel ornamental design of a swivel connector for a hose which can be employed in the hose of a fuel dispensing system.

Although the prior art hose swivels worked well in limited applications, they suffered from some drawbacks. For example, the prior art swivel provided in the '547 patent includes fluorocarbon and fluorosilicone O-rings for sealing and for the facilitation of rotation. However, the swivel becomes difficult to rotate under higher fuel pressures, such as 30 psi to 50 psi, which commonly are used today. Also, some competitive prior art swivels are not adapted for use in vapor recovery fuel dispensing systems that include vapor recovery lines or channels in the fuel dispensing hose.

It would be advantageous, therefore, to have a swivel for use in a fuel dispensing system fuel dispensing hose that can accommodate a vapor recovery channel that does not rely on the sealing O-rings to facilitate rotation and that maintains its ability to rotate freely even at higher fuel pressures, such as 30 psi to 50 psi or more.

SUMMARY OF THE INVENTION

It is among the general objects of the invention to provide a swivel for use in a fuel dispensing system that maintains its ability to rotate at higher fuel pressures.

Another object of the invention to provide a swivel for use in a fuel dispensing system that employs ball bearings at its junctures to facilitate rotation.

Still another object of the invention is to provide a swivel for use in a fuel dispensing system that is double sealed about the points of rotation to prevent leakage of fuel or accumulation of debris.

Another object of the invention is to provide such a swivel that can be adapted for use in any fuel dispensing system hose including a hose with a vapor recovery channel or hoses of various external or internal diameters.

Still another object of the present invention is to provide such a swivel that is impervious to any deleterious effect of hydrocarbon fuels.

Yet an other object of the present invention is to provide such a swivel that is economical and relatively simple to manufacture and assemble, which can be retrofitted to existing fuel dispensing hoses, and is well suited for its intended purposes.

In accordance with the invention, generally stated, a ball bearing swivel connectable between the output end of a fuel dispensing hose and the input end of a fuel dispensing nozzle to allow multi-plane rotation of the nozzle for alignment of the nozzle with the fuel filltube of a vehicle is provided. The swivel includes three segments, a nozzle fitting, a midsection, and a hose fitting. The nozzle fitting and the hose fitting are joined to the midsection by ball bearing races which allow each segment to rotate 360° relative to the adjacent segment. The ball bearing races are positioned between a first and second O-ring seal forming a double seal to prevent dust or dirt accumulation and fuel leakage. The ball bearing races allow rotation of the swivel under increased fluid pressure conditions.

BRIEF DESCRIPTION OF THE DRAWINGS

Corresponding reference numbers indicate corresponding elements throughout the various drawing figures.

DETAILED DESCRIPTION OF THE INVENTION

Figure 3:
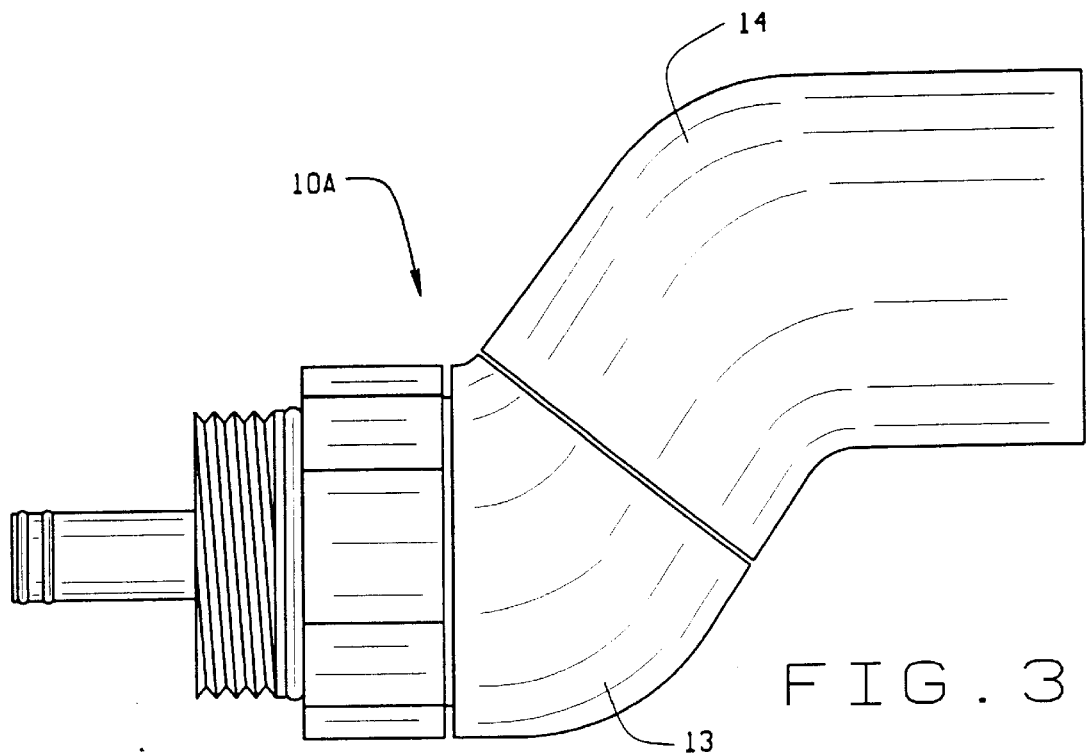
FIG. 3 is a side elevational view of another preferred embodiment of the ball bearing swivel of the present invention.
Figure 4:
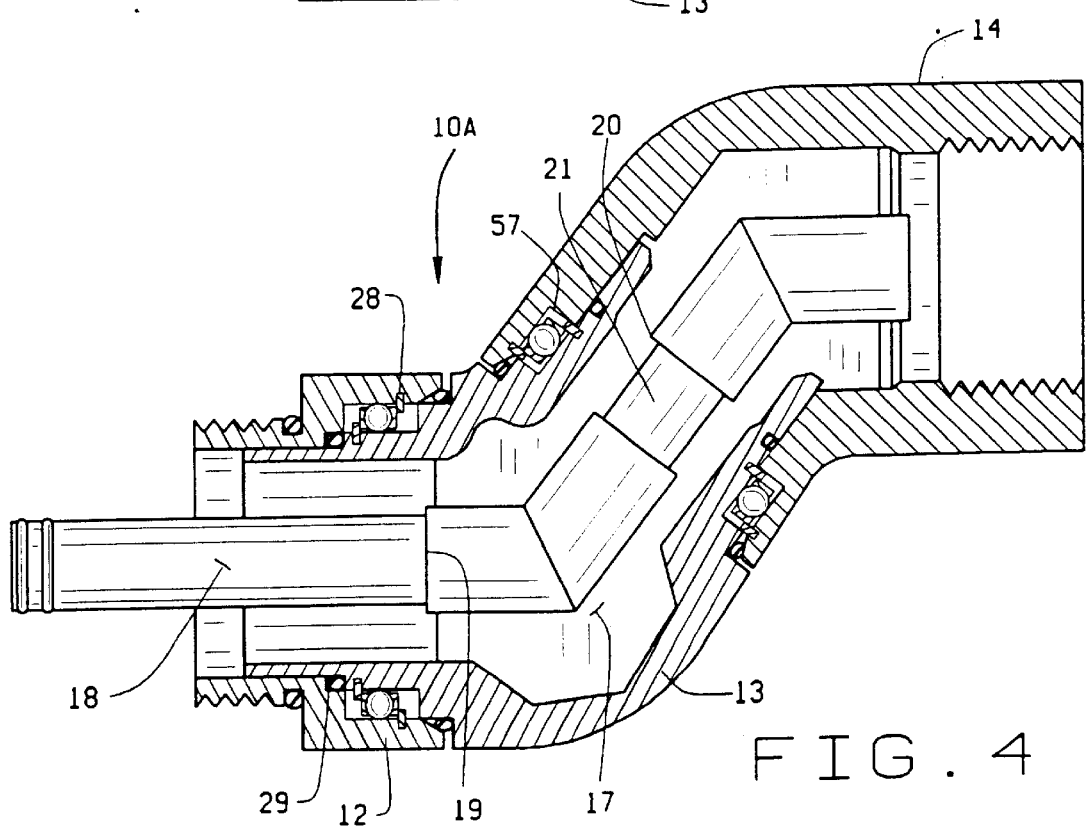
FIG. 4 is a cross-sectional view thereof.

A ball bearing swivel of the present invention is indicated generally by reference number 10 in the figures. Ball bearing swivel 10 is designed to allow articulation at the juncture between a fuel dispensing hose and a fuel dispensing nozzle employed in a fuel dispensing system. It will be appreciated, however, that ball bearing swivel 10 may be employed in fluid dispensing environments other than fuel dispensing systems without departing from the scope of the invention. Ball bearing swivel 10A, as shown in FIGS. 3 and 4, is intended to be used in a fuel dispensing system which includes a vapor recovery pathway. In any event, swivels 10 and 10A both satisfy the various objects of the invention.

As seen the figures, the swivel includes three generally tubular body segments, 12, 13 and 14. The respective segments are rotatably connected at junctures which include ball bearings races, as will be explained in greater detail below, which allow each segment to rotate 360° about its axis relative to an adjoining segment. The respective segments of the swivel can be formed by casting using the method disclosed in U.S. Pat. No. 4,615,547, which is incorporated herein by reference, or may be cast, machined or manufactured by any satisfactory method.

Figure 1:
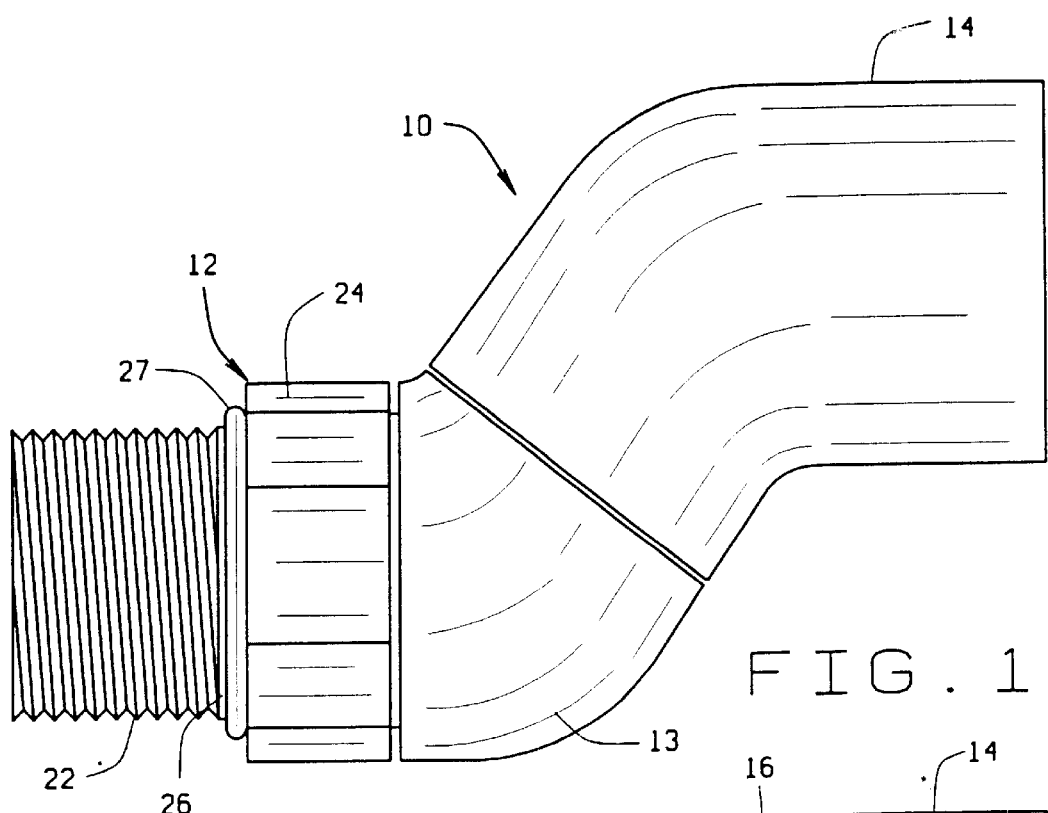
FIG. 1 is a side elevational view of one preferred embodiment of the ball bearing swivel of the present invention.
Figure 2:
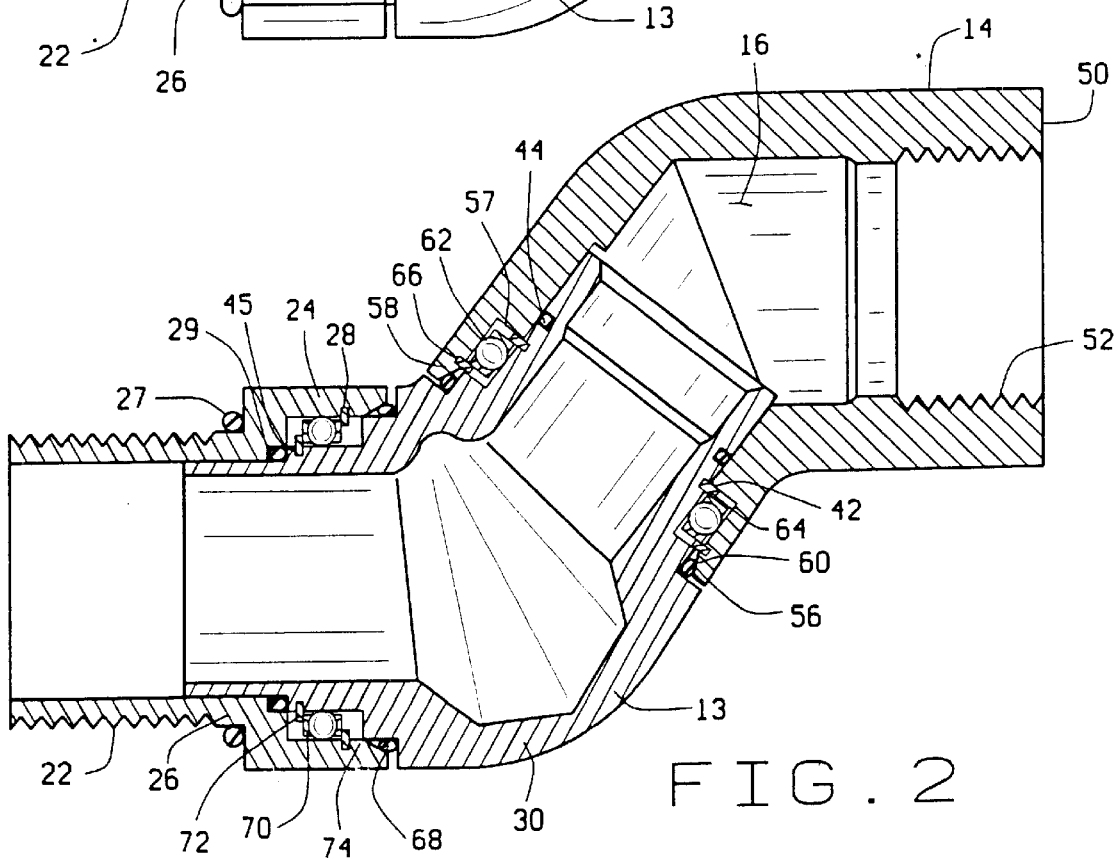
FIG. 2 is a cross-sectional view thereof.

As seen in FIG. 2, when the respective tubular segments of swivel 10 are joined in their useful configuration, they form a contiguous internal fluid flow pathway 16 that extends between the hose fluid flow pathway and that of dispensing nozzle. As seen in FIG. 4, in swivel 10A, designed for use with a vapor recovery fuel delivery system, the joined tubular segments define an internal fluid flow pathway 17. A concentric vapor recovery pathway 18 extends through the fluid flow pathway. The concentric vapor recovery pathway 18 includes a first sealed rotatable joint 19 having internal sealing rings (not shown) and a second sealed rotatable joint 20. The second rotatable joint 20 comprises a tubular polymer bearing 21 inserted between two sections of the concentric vapor recovery pathway 18.

Segment 12, which can be defined generally as a male connector nut for attachment to a dispensing nozzle or as a nozzle connector, includes an externally threaded connector 22 a faceted collar 24 with an interposed shoulder 26 for the seating of a sealing O-ring 27. Threaded connector 22 is designed to thread tightly within the standard end of a dispenser nozzle. The faceted collar 24 allows the application of a wrench to facilitate tightening within the nozzle. The O-ring 27 seals the connection against leakage. The internal surface of collar 24 is stepped and has a narrow groove 28 for a snap ring and a wider groove 29 having a lesser circumference to seat a sealing O-ring as will be explained below.

The midsection 13 in the preferred embodiment, includes a body 30 with a first extension 31 at a first end and a second extension 33 at a second end. As shown, midsection 13 has a substantially curved or elbow-shaped profile. Between the body 30 and first extension 31 is a boss 35 of lesser diameter than the body but of a greater diameter than the extension 31 creating a first shoulder 37 and a second shoulder 39. Likewise, between the body 30 and the second extension 33 is a boss 41 of lesser diameter than the body but of a greater diameter than the extension 33 also creating a first shoulder and a second shoulder. Extension 31 has a circumferential snap ring groove 42 and a circumferential seal groove 43 formed at the approximate midpoint. The seal groove 43 is for the seating of an outer O-ring seal 44. Likewise, extension 33 has a circumferential snap ring groove 45 and a circumferential seal groove 46 for the seating of outer O-ring seal 48. The outer O-ring seals 44 and 48 are made from a synthetic polymer which is compatible with fuels to prevent premature deterioration and wear. The polymers have low temperature flexibility and high resistance to wear to prevent leakage. For example the outer O-rings can be formed of fluorosilicone or fluorocarbon, but fluorosilicone is preferred for these fuel seals.

Segment 14, which is defined generally as a hose connector, is designed to rotatably attach to the output end of a hose at a first end and to the midsection 13 at a second end. As shown, segment 14 is tubular and has a substantially elbow-shaped profile. The first open end 50 has internal threads 52 for the threaded attachment to the externally threaded output end of a hose. The second open end 54 has a beveled lip 56, which prevents binding between segments during rotation, and a stepped internal surface forming shoulder 57 with a circumferential groove 58 for a snap ring as will now be explained.

Figure 5:
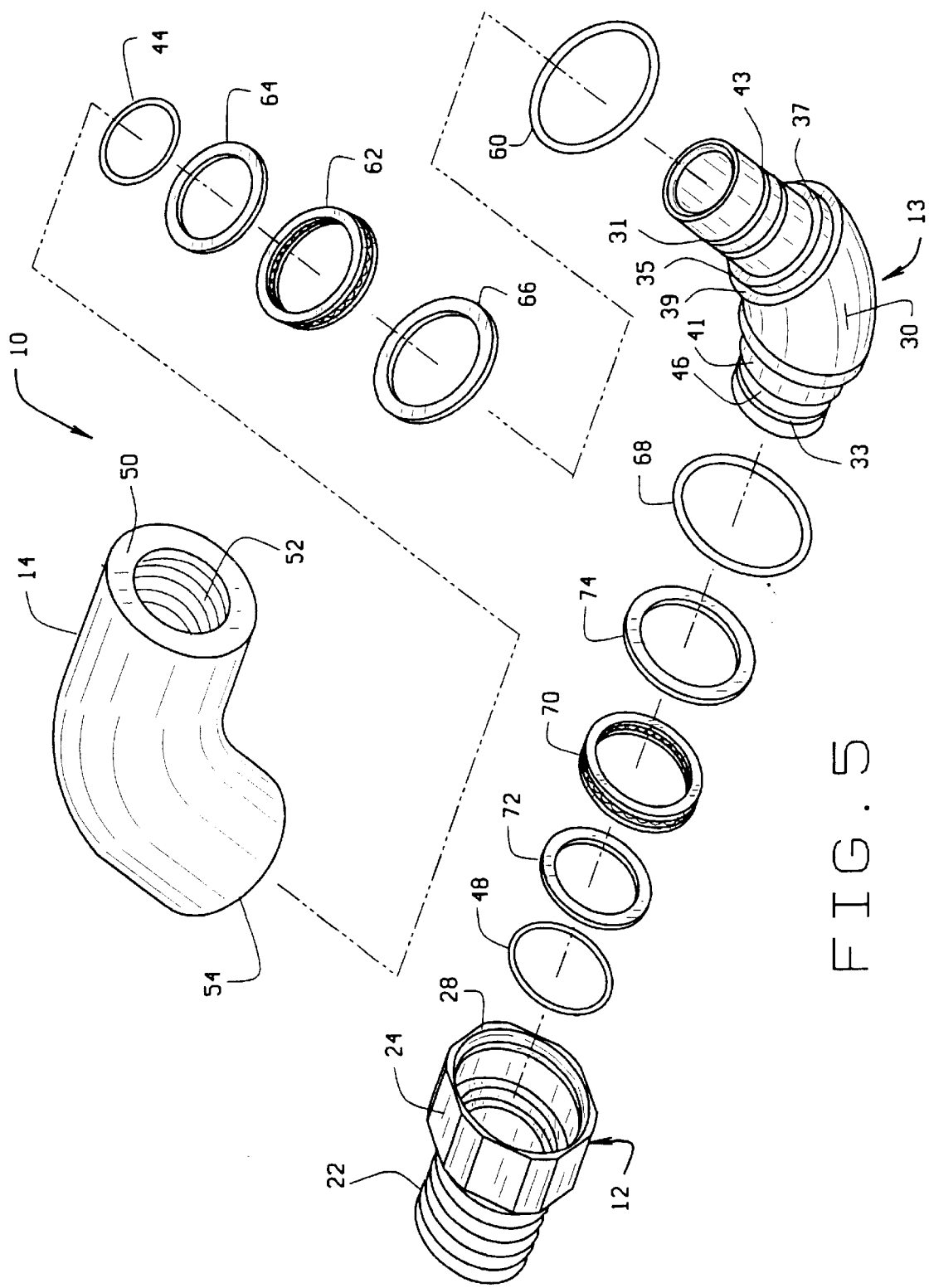
FIG. 5 is an exploded view of the preferred embodiment of the ball bearing swivel of the present invention illustrated in FIG. 1.

The assembly and function of the swivel which allows free movement of the swivel under high fluid pressure while maintaining seals against leakage and debris is best seen by referring to FIGS. 2 and 4 along with FIG. 5. The first extension 31 of middle segment 13 rotatably seats within the second open end 54 of the hose connector segment. An inner O-ring 60 formed of fluorosilicone or fluorocarbon, but preferably fluorocarbon, abuts shoulder 39. A circular ball bearing race 62 is positioned adjacent boss 35. A first snap ring 64 and second snap ring 66 are compressed into position in the snap ring grooves on each side of the ball bearing race 62 secures the ball bearing race in position, O-ring 44 provides a fuel impervious seal within the swivel. O-ring 60 seals the juncture between the midsection and the hose connector section from the introduction of external debris to the ball bearings and also to prevent fuel leakage.

The second extension 33 of middle segment 13 rotatably seats within collar 24 of the nozzle connector as illustrated. An inner O-ring 68 formed of fluorosilicone or fluorocarbon, but preferably fluorocarbon, is positioned over boss 41. A circular ball bearing race 70 is positioned adjacent boss 41. A first snap ring 72 and second snap ring 74 are compressed into position in the snap ring grooves on each side of the ball bearing race 70 secures the ball bearing race in position. O-ring 48 provides a fuel impervious seal within the swivel and O-ring 68 seals the juncture between the midsection and the nozzle connector from the introduction of external debris to the ball bearings and also to prevent fuel leakage.

The respective segments of the swivel freely rotate about the ball bearings. Moreover, due to the presence of the ball bearings, the swivel functions well even under high internal fluid pressures. The presence of the double seal, one each on each side of a ball bearing race, prevents fuel leakage and prevents entry or accumulation of debris at the junctures of the segments which could impede rotation, damages the bearings and cause excessive wear.

It will be appreciated that various changes and modifications may be made in the invention without departing from the scope of the appended claims. Therefore, the foregoing description and accompanying drawings are intended to be illustrative only and should not be construed in a limiting sense.

What is claimed is:

1. A swivel for mounting between an output end of a hose fitting for a fuel dispensing system, and the input end of a nozzle fitting for a fuel dispensing system, comprising:
a midsection having a first extension end and a second extension end, said first and second extension ends being male extending ends;
a first ball bearing race having an inner bearing surface and an outer bearing surface, the inner bearing surface being positioned about the first male extension end of the midsection; a hose fitting rotatably connected to the midsection, the hose fitting having a first female open end and a second female open end, the second female open end being positioned about the outer bearing surface of the first ball bearing race;
a first O-ring seal positioned on a first side of the first ball bearing race;
a second O-ring seal positioned on a second side of the first ball bearing race, said first and second O-ring seals forming a fuel and debris impervious seal between the midsection and the hose fitting, when connected; snap rings provided to either side of the first ball bearing race and cooperating with the first male extension end of the midsection and the second female open end of the hose fitting to provide for engagement between the midsection and the hose fitting when assembled for swivel mounting;
a second ball bearing race having an inner bearing surface and an outer bearing surface, the inner bearing surface being positioned about the second male end of the midsection; a nozzle fitting rotatably connected to the midsection, the nozzle fitting having a first female open end and a second male open end, the first female open end being positioned about the outer bearing surface of the second ball bearing race;

a third O-ring seal positioned on a first side of the second ball bearing race; and a fourth O-ring seal positioned on a second side of the second ball bearing race, said third and fourth O-ring seals forming a fuel and debris impervious seal between the midsection and the nozzle fitting;

another pair of snap rings provided at the sides of the second ball bearing race and cooperating between the first female open end of the nozzle fitting and the first male extension end of the midsection to secure for swivel motion the midsection and the nozzle fitting for swivel movement when assembled.

2. The swivel of claim 1 wherein the second and third O-rings are formed of a fluorocarbon.

3. The swivel of claim 1 wherein the second and third O-rings primarily are fluid seal O-rings.

4. The swivel of claim 1 wherein the first end of the hose fitting is internally threaded for threaded attachment to the externally threaded end of a hose.

5. The swivel of claim 1 wherein the second end of the nozzle fitting is externally threaded for threaded attachment wherein the first end of the hose fitting is internally threaded for threaded attachment to the externally threaded end of a hose.

6. The swivel of claim 5 wherein the first female end of the nozzle fitting further comprises a multifaceted external surface for the application of a tool to threadedly attach the nozzle fitting to the dispensing nozzle.

* * * * *